United States Patent
Fujimura et al.

(10) Patent No.: US 9,833,004 B2
(45) Date of Patent: *Dec. 5, 2017

(54) FLOUR COMPOSITION

(71) Applicant: NISSHIN FOODS INC., Tokyo (JP)

(72) Inventors: Ryosuke Fujimura, Tokyo (JP); Michihiro Sakakibara, Tokyo (JP); Tatsunori Nishide, Tokyo (JP); Yoshihito Ueki, Tokyo (JP); Satomi Nozaki, Saitama (JP); Miwa Takahashi, Saitama (JP); Shin-ichi Fukudome, Saitama (JP); Takashi Horimizu, Saitama (JP); Tetsuya Mitsuoka, Saitama (JP); Noriko Sakamoto, Saitama (JP)

(73) Assignee: NISSHIN FOODS INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/035,596

(22) PCT Filed: Dec. 26, 2014

(86) PCT No.: PCT/JP2014/084585
§ 371 (c)(1),
(2) Date: May 10, 2016

(87) PCT Pub. No.: WO2015/107858
PCT Pub. Date: Jul. 23, 2015

(65) Prior Publication Data
US 2016/0278392 A1 Sep. 29, 2016

(30) Foreign Application Priority Data

Jan. 16, 2014 (JP) .................................. 2014-006114

(51) Int. Cl.
*A23L 1/035* (2006.01)
*A21D 6/00* (2006.01)
*A21D 2/16* (2006.01)
*A21D 2/32* (2006.01)

(52) U.S. Cl.
CPC .............. *A21D 6/003* (2013.01); *A21D 2/16* (2013.01); *A21D 2/32* (2013.01)

(58) Field of Classification Search
CPC ............. A21D 2/16; A21D 2/32; A21D 6/003
USPC ................ 426/438, 520, 523, 625, 601, 654
See application file for complete search history.

(56) References Cited

U.S. PATENT DOCUMENTS 3,733,210 A * 5/1973 Selden ................... A21D 10/00
426/305

FOREIGN PATENT DOCUMENTS

| JP | 61-47162 | 3/1986 |
|----|----------|--------|
| JP | 62-143659 | 6/1987 |
| JP | 2003-235482 | 8/2003 |
| JP | 2007-117002 | 5/2007 |
| JP | 2010-187602 | 9/2010 |
| JP | 2013-21972 | 2/2013 |

OTHER PUBLICATIONS

International Search Report, PCT/JP2014/084585, dated Apr. 7, 2015.

* cited by examiner

*Primary Examiner* — Helen F Heggestad
(74) *Attorney, Agent, or Firm* — Young & Thompson

(57) ABSTRACT

A cereal flour composition is made by subjecting a mixture to a heating treatment, the mixture including: a cereal flour; and 0.2-10 parts by mass of an emulsifier with respect to 100 parts by mass of the cereal flour. Preferably, the emulsifier is a monoglycerol fatty acid ester or lecithin. Preferably, the heating treatment is performed for 2 seconds to 3 minutes at a mixture temperature of 80 to 120° C. Preferably, the heating treatment is a heat-moisture treatment using saturated water vapor. A process for producing the cereal flour composition involves a heating step of directly applying saturated water vapor to the mixture including a cereal flour and an emulsifier, and heating the mixture, wherein the heating step is performed by using a production device including: a transporting path that transports an introduced raw material to an outlet; and a mechanism that introduces saturated water vapor into the transporting path.

7 Claims, No Drawings

FLOUR COMPOSITION

TECHNICAL FIELD

The present invention relates to a thermally-treated cereal flour composition that includes a cereal flour, such as wheat flour, as a main component, and that is obtained through a step of subjecting the cereal flour to a heating treatment.

BACKGROUND ART

There is a demand that wheat flour-containing foods including e.g. deep-fried foods, such as tempura etc., okonomiyaki (Japanese-style pancakes), and spongy confectionery, such as pancakes etc., should not undergo texture degradation over time after being heated and cooked or texture degradation when re-heated in a microwave oven etc., and should maintain an excellent biting sensation, meltability in the mouth, and a light texture equivalent to the sensation/texture obtained immediately after being heated and cooked. As a technique for obtaining a wheat flour-containing food satisfying the demanded characteristics, Patent Literature 1 discloses a process in which the pH of a fluid dough obtained from a cereal flour material including wheat flour as a main component is adjusted twice to fail within specific ranges.

Also, it has been conventionally known to subject cereal flour to a heating treatment with the aim of deactivation of enzymes in the cereal flour, sterilization of the cereal flour, and also quality improvement. For example, Patent Literature 2 discloses a wheat composition suitable for steamed food products, such as steamed buns or steamed bread. The wheat composition is obtained by: mixing a wheat flour and 0.1 to 2.0 parts by mass of an emulsifier (e.g. glycerol fatty acid ester) with respect to 100 parts by mass of the wheat flour; and then subjecting the mixture to an indirect heating treatment under conditions where the product temperature is from 80 to 150° C. and the heating time is from 5 to 120 minutes. In the indirect heating treatment, heated water vapor is used as a heat source, and the heated water vapor is not directly applied to the mixture including the wheat flour and the emulsifier, but is applied to a container containing the mixture, and the mixture inside the container is heated indirectly; here, the mixture is subjected to a dry-heat treatment, and not to a heat-moisture treatment. With the wheat composition disclosed in Patent Literature 2, it is possible to obtain a steamed food product having a soft, plump appearance and resilient tactile feel while offering a moist texture and meltability in the mouth. Also, it is disclosed that, even after being stored/distributed and re-steamed or heated in a microwave oven, the obtained steamed food product is capable of maintaining a soft, plump appearance and a melt-in-the-mouth texture without becoming hard.

Similar to Patent Literature 2, Patent Literature 3 also discloses an indirect heating treatment of a mixture including wheat flour and an emulsifier, and describes that it is possible to obtain an okonomiyaki premix that gives a dough capable of being cooked directly in a microwave oven.

Patent Literature 4 discloses a processed-food quality improving agent that is for improving quality such as texture and that is added to food materials with high moisture content or to food products whose texture is likely to become dry and stale as a result of the outflow of extract components when heated and cooked. The quality improving agent is obtained by heating and kneading cereal flour having a moisture content of from 10 to 40 wt % in the presence of an emulsifier at a product temperature of 55° C. or higher, to pregelatinize the starch component. It is also disclosed that the heating/kneading of the cereal flour is performed by using a uniaxial or biaxial screw-type extruder. According to Patent Literature 4, the processed-food quality improving agent disclosed in Patent Literature 4 has a swelling degree within the range of from 5.9 to 8; thus, this product is considered to be substantially equivalent to pregelatinized wheat flour.

CITATION LIST

Patent Literature

Patent Literature 1: JP 2010-187602A
Patent Literature 2: JP 2007-117002A
Patent Literature 3: JP 2013-21972A
Patent Literature 4: JP S61-47162A

SUMMARY OF INVENTION

The present invention is a cereal flour composition made by subjecting a mixture to a heating treatment, the mixture including: a cereal flour; and 0.2 to 10 parts by mass of an emulsifier with respect to 100 parts by mass of the cereal flour.

Also, the present invention is a cereal flour premix including the aforementioned cereal flour composition, or a cereal flour-containing food produced by using the aforementioned cereal flour composition (the cereal flour premix).

Also, the present invention is a process for producing the aforementioned cereal flour composition, the process involving: a heating step of directly applying saturated water vapor to the mixture including a cereal flour and an emulsifier, and heating the mixture, wherein: the heating step is performed by using a production device including a transporting path that transports an introduced raw material to an outlet, and a mechanism that introduces saturated water vapor into the transporting path; and in the heating step, the mixture in the transporting path is not pressed toward the outlet side by using an extrusion tool.

DESCRIPTION OF EMBODIMENTS

The present invention relates to a cereal flour composition capable of providing a cereal flour-containing food in which the excellent texture obtained immediately after being produced is less prone to deteriorate over time, and that is capable of maintaining excellent texture even when it is re-heated in a microwave oven etc.

The cereal flour composition of the present invention includes at least a cereal flour and an emulsifier.

As for the cereal flour included in the cereal flour composition of the present invention, any cereal flour ordinarily used in various types of food may be used without partcular limitation. Examples of the cereal flour include: wheat flour, such as soft wheat flour (cake flour), medium-strength wheat flour (all-purpose flour), and hard wheat flour (bread flour); cereal flour, such as buckwheat flour, corn flour, barley flour, rye flour, adlay flour, Japanese barnyard millet flour, and foxtail millet flour; starch, such as tapioca starch, potato starch, corn starch, waxy corn starch, wheat starch, and rice starch; and processed starch obtained by subjecting the aforementioned starch to a treatment such as pregelatinization, etherification, esterification, acetylation, cross-linking, and/or oxidation. A single type of the aforementioned cereal flour may be used alone, or two or more types may be used in combination. Among the aforementioned cereal flour, wheat flour is particularly preferable.

As for the emulsifier included in the cereal flour composition of the present invention, any emulsifier ordinarily used in various types of food may be used without particular limitation. Examples of the emulsifier include monoglycerol fatty acid esters, propylene glycol fatty acid esters, sorbitan fatty acid esters, sucrose fatty acid esters, lecithin, and lysolecithin. A single type of the aforementioned emulsifier may be used alone, or two or more types may be used in combination. Particularly, among the aforementioned emulsifiers, monoglycerol fatty acid esters and lecithin are preferable, and monoglycerol fatty acid esters are particularly preferable.

The blending ratio between the cereal flour and the emulsifier in the cereal flour composition of the present invention is from 0.2 to 10 parts by mass, preferably from 0.2 to 5 parts by mass, more preferably from 0.2 to 1.5 parts by mass, of emulsifier with respect to 100 parts by mass of cereal flour. If the amount of the emulsifier is less than 0.2 parts by mass with respect to 100 parts by mass of wheat flour, the texture (particularly the biting sensation) of the cereal flour-containing food produced by using the cereal flour composition may deteriorate. Also, the dispersibility of the cereal flour composition to water may deteriorate, which in turn may deteriorate workability, such as the preparation of batter using the composition, and increase the workload for producing cereal flour-containing food such as deep-fried food. On the other hand, if the amount of the emulsifier is greater than 10 parts by mass with respect to 100 parts by mass of wheat flour, the texture (particularly the flavor) of the cereal flour-containing food produced by using the cereal flour composition may deteriorate.

The cereal flour composition of the present invention is obtained by subjecting a mixture, in which a cereal flour and an emulsifier are blended at the aforementioned blending ratio, to a heating treatment. The heating treatment is preferably a treatment of performing heating for 2 seconds to 3 minutes under a condition in which the temperature of the mixture (the product temperature) is from 80 to 120° C. If the product temperature of the mixture in the heating treatment is below 80° C., the texture (particularly the biting sensation) of the cereal flour-containing food produced by using the cereal flour composition may deteriorate; whereas if the product temperature is above 120° C., the production steps may become complicated, and also, the size of the cereal flour composition particles may become too large. If the size of the cereal flour composition particles becomes too large, the average particle diameter of the cereal flour composition will increase; this will result in an increase in the amount of oil absorbed by the crust of the cereal flour-containing food (e.g. tempura) obtained by deep-flying a food material including the cereal flour composition, thus making the texture stiff. Further, if the heating time is shorter than 2 seconds or longer than 3 minutes, the texture (particularly the flavor and color) of the cereal flour-containing food produced by using the cereal flour composition may deteriorate. In the heating treatment for the mixture including a cereal flour and an emulsifier, the product temperature of the mixture is preferably from 90 to 120° C. Further, the heating time of the mixture (i.e., the time over which the product temperature is maintained) is preferably from 2 seconds to 15 seconds.

It should be noted that, at the time of subjecting the mixture including a cereal flour and an emulsifier to the heating treatment, a dry cereal flour having a moisture content of less than 10 mass % may be used as the starting-material cereal flour. By performing the heating treatment by using such dry cereal flour, the degree of thermal treatment applied to the cereal flour can be mitigated, and a cereal flour composition obtained accordingly is particularly suitable as a raw material for bread and bakery products.

As described above, the heating treatment for obtaining the cereal flour composition of the present invention only requires a mild treatment in which the heating temperature (product temperature) is relatively low and the treatment time is relatively short. Thus, water and/or water vapor can be suitably used as a thermal medium for the heating treatment. More specifically, the heating treatment for obtaining the cereal flour composition of the present invention is preferably a heat-moisture treatment using water and/or water vapor. As for the water vapor, saturated water vapor is preferably used. In the heat-moisture treatment, water is added to the mixture including a cereal flour and an emulsifier, or water vapor (saturated water vapor) is directly applied to the mixture, and the mixture is heated. As described above, Patent Literatures 2 and 3 describe that the mixture including a cereal flour and an emulsifier is subjected to a thy-heat treatment. In contrast, in the present invention, a heat-moisture treatment is recommended, and not dry-heat treatment. It should be noted that a heat-moisture treatment is a heating treatment performed while maintaining the moisture content in the raw material, or while adding moisture thereto. On the other hand, a dry-heat treatment is a thermal treatment in which a raw material is placed in a container and the container is heated from outside without adding any moisture, and is a thermal treatment in which moisture in the raw material is actively evaporated.

An example of a heat-moisture treatment for obtaining the cereal flour composition of the present invention is a process of: adding water to a mixture including a cereal flour and an emulsifier; placing the water-added mixture in a hermetically-sealable container such as an aluminum pouch; hermetically sealing the container; and heating the container under pressure. Another example of a heat-moisture treatment for obtaining the cereal flour composition of the present invention is a process of adding water to a mixture including a cereal flour and an emulsifier; placing the water-added mixture in a hermetically-sealable container; and then introducing saturated water vapor into the container and heating the mixture under pressure while stirring the mixture if necessary. The latter process can be performed, for example, by using a continuous powder transporting device (hermetically-sealed high-speed stirring machine) that has a stirring-and-transporting mechanism and that is warmed by a warming means such as a jacket, and subjecting the mixture to a heating treatment (heat-moisture treatment) in a saturated water vapor atmosphere. It should be noted that the expression "under pressure" as used herein means that a pressurized state is achieved mainly by vapor that fills the container, and does not encompass cases where the mixture is brought into a pressurized state by pressing an object such as an extrusion tool (a member corresponding to a screw of an extruder) into contact with the mixture.

In the heat-moisture treatment for obtaining the cereal flour composition of the present invention, in cases of adding water to the mixture including a cereal flour and an emulsifier, the amount of water to be added is preferably from 0 to 20 mass %, more preferably from 1 to 10 mass %, with respect to the mixture. The gauge pressure (i.e., the pressure measured by employing atmospheric pressure as the zero reference) in a system (hermetically-sealable container) for performing the heat-moisture treatment is preferably from 0 to 200 kPa, more preferably from 30 to 100 kPa.

It should be noted that, in the heating treatment (heat-moisture treatment) for obtaining the cereal flour composition of the present invention, the temperature (product temperature) of the mixture may be "the product temperature of the cereal flour or the emulsifier during heating," or may be "the product temperature of the cereal flour or the emulsifier constituting the mixture when the mixture is discharged from the system (e.g. hermetically-sealable container) where the heating treatment was performed" (i.e., the exit temperature). Further, the heating time of the Mixture (i.e., the time over which. the product temperature of the mixture is maintained) may be "the time over which the mixture is in contact with the saturated water vapor," or may be "the residence time of the mixture in the system (e.g. hermetically-sealable container) where the heating treatment is performed".

A preferred example of a process for producing the cereal flour composition of the present invention is the following production process.

A process for producing a cereal flour composition includes a heating step of directly applying saturated water vapor to a mixture including a cereal flour and an emulsifier, and heating the mixture. The heating step is performed by using a production device (referred to hereinafter also as "specific production device") including: a transporting path that transports an introduced raw material to an outlet; and a mechanism that introduces saturated water vapor into the transporting path. In the heating step, the mixture in the transporting path is not pressed toward the outlet side by using an extrusion tool.

A concrete example of the aforementioned preferred production process is a process involving: mixing wheat flour and an emulsifier at the aforementioned blending ratio; placing the mixture in a hermetically-sealable container that has been warmed with a warming means such as a jacket; and heating the mixture by blowing heating water vapor into the hermetically-sealable container while stirring. Another concrete example of the aforementioned preferred production process is a heating treatment process involving: using, as the aforementioned specific production device, a continuous powder transporting device (hermetically-sealed high-speed stirring machine) that has a stirring-and-transporting mechanism and is warmed by a warming means such as a jacket; continuously introducing wheat flour and an emulsifier at the aforementioned blending ratio into the continuous powder transporting device, and stirring and transporting the mixture; and, while stirring and transporting the mixture, introducing saturated water vapor at a high pressure into the device, and heating and stirring the mixture to a desired heating temperature for a desired heating time. This continuous powder transporting device (specific production device) is provided with a stirring machine which includes, within the transporting path: a stirring shaft extending along the raw-material transporting direction; and a stirring blade that is implanted helically around the circumference of the stirring shaft. The stirring machine is capable of stirring the raw material (the mixture) in the transporting path, but the stirring machine is strictly a member for stirring the raw material in the transporting path, and is not an extrusion tool for pressing the raw material to the outlet. Thus, the heating treatment device does not have such an extrusion tool (a member corresponding to a screw of an extruder). Stated differently, a preferred example of a process for producing the cereal flour composition of the present invention does not employ a uniaxial or biaxial screw-type extruder as disclosed in Patent Literature 4.

A granulated product can be obtained by subjecting the mixture including a cereal flour and an emulsifier to a heating treatment (heat-moisture treatment) as described above. The granulated product is the cereal flour composition, which is the target product. It is preferable that the thus-obtained granulated product is dried and used. Examples of processes for drying include shelf drying, hot-air drying, and fluidized bed drying; a drying process may be chosen as appropriate depending on the process for heat-treating the mixture. After drying, if necessary, the particle diameter of the granulated product is adjusted as appropriate according to a known process.

The cereal flour composition of the present invention (the cereal flour composition produced by performing the heating treatment process using the aforementioned continuous powder transporting device) has a swelling degree of preferably from 1.5 to 4.0, more preferably from 1.8 to 3.8. A higher swelling degree indicates that gelatinization (pregelatinization) of the cereal flour composition has progressed. In general, the swelling degree of pregelatinized wheat flour is within the range from 5.5 to 9.0; thus, in the cereal flour composition of the present invention having a swelling degree within the aforementioned preferable range, gelatinization has not progressed as much as pregelatinized wheat flour, and the present cereal flour composition is a completely different substance from pregelatinized wheat flour. Setting the swelling degree of the cereal flour composition within the range from 1.5 to 4.0 further improves the texture (particularly the biting sensation) of the cereal flour-containing food produced by using the cereal flour composition.

The swelling degree of the cereal flour composition is measured according to the following process (the process for measuring heat swelling degree as disclosed in JP 2005-54028A). Using a hermetically-sealable test tube, 100 mg of a measurement sample (cereal flour composition) in dry weight is measured, and 10 mL of deionized water is added to the test tube, to obtain a water dispersion of the measurement sample. The water dispersion is heated at 90° C. for 30 minutes, and then cooled under running water for 5 minutes. Then, the water dispersion is centrifuged at 3000 rpm for 10 minutes, the supernatant water layer is removed, the weight of the residue (starch paste) is measured, and the swelling degree to be measured is calculated according to the following equation:

$$\text{Swelling degree} = \text{Weight of starch paste (mg)}/100 \text{ (mg)}$$

Next, the cereal flour premix of the present invention is described. The cereal flour premix of the present invention includes the aforementioned cereal flour composition of the present invention. The form of the cereal flour premix of the present invention is not particularly limited, and it may be a solid matter (powder, etc.) or it may be a liquid-form product (so-called batter) obtained by adding and mixing water to a solid-form cereal flour premix.

The cereal flour premix of the present invention may include only the aforementioned cereal flour composition of the present invention, or may include other components in addition to the cereal flour composition. For such other components, any component generally used in this type of cereal flour premix may be used without particular limitation. Examples of other components include soybean protein, wheat protein, egg powder, dietary fiber, thickening agents, leavening agents, table salt, sugars, sweeteners, spices, seasonings, vitamins, minerals, coloring agents, and aroma flavorings. A single type of the aforementioned component may be used alone, or two or more types may be used in combination.

The cereal flour premix of the present invention can be used as a raw material for various cereal flour-containing foods. Examples of cereal flour-containing foods in which the cereal flour premix of the present invention can be used include: bread and bakery products; spongy confectionery, Western-style confectionery, and puff shell confectionery; okonomiyaki and takoyaki (Japanese-style octopus dumplings); flour pastes and sauces; batter for deep-fried foods; and spring roll wrappers and pie dough.

EXAMPLES

The present invention is described in further detail below according to Examples thereof. The present invention, however, is not limited to the following Examples.

Examples 1 to 15, Comparative Examples 1 and 2, and Reference Examples 1 to 3

Soft wheat flour (Flour; product from Nisshin Flour Milling Inc.) was used as wheat flour, and a monoglycerol fatty acid ester (Emulsy MS; product from Riken Vitamin Co., Ltd.) or a soybean-derived lecithin (SLP-White; product from Tsuji Oil Mills, Co., Ltd.) was used as an emulsifier, and the wheat flour and the emulsifier were blended in amounts shown in the Tables below and were mixed uniformly, to obtain a mixture. The mixture was introduced into a hermetically-sealed high-speed stirring device, and while introducing saturated water vapor into the stirring device, the mixture was subjected to a heating treatment (heat-moisture treatment) at a predetermined heating temperature (temperature at the outlet) for a predetermined time. The mixture was dried after the heating treatment, to obtain a cereal flour composition according to each of the Examples and Comparative Examples. The hermetically-sealed high-speed stirring device used here had a similar structure to the aforementioned continuous powder transporting device (specific production device), i.e., had, within a transporting path for transporting the introduced raw material to the outlet, a stirring machine which includes: a stirring shaft extending along the raw-material transporting direction; and a stirring blade implanted helically around the circumference of the stirring shaft. The stirring device was configured so as to be capable of stirring the raw material (the mixture) in the transporting path by the stirring machine, and did not have an extrusion tool for pressing the raw material to the outlet.

Comparative Example 3

A cereal flour composition was obtained as in Example 2, except that the mixture including the wheat flour and the emulsifier was not heated.

Test Example

By using each cereal flour composition according to the respective Examples, Comparative Examples, and Reference Examples, a pancake (spongy confectionery), which is a type of cereal flour-containing food, was produced according to the process described below. After production (baking), the pancake was promptly subjected to quick-freezing at −30° C., and was then stored at −15° C. for one week. Then, the freeze-stored pancake was heated and thawed in a microwave oven, and the flavor and the texture (biting sensation, moistness, and meltability in the mouth) of the pancake were evaluated by 10 panelists according to the following evaluation criteria. The evaluation results (average score of 10 panelists) are shown in Tables 1 to 3 below.

Process for Producing Pancake:

(1) A cereal flour premix was prepared by mixing 72 parts by mass of soft wheat flour (Flour; product from Nisshin Flour Milling Inc.), 5 parts by mass of the cereal flour composition to be tested, 20 parts by mass of sugar, 0.2 parts by mass of table salt, and 2.8 parts by mass of a leavening agent (sodium hydrogen carbonate) (100 parts by mass in total).

(2) Next, 200 g of an egg-milk solution prepared by mixing 50 g of egg and 150 g of milk was added to 200 g of the cereal flour premix and mixed well, to prepare a batter.

(3) The batter was poured onto a griddle preheated to 170° C., cooked for 3 minutes, turned over and cooked for 3 minutes, to produce a pancake.

{Criteria for Evaluating Flavor}
Good: Excellent, with no bitterness/acridness.
Fair: Almost no bitterness/acridness, and no unpleasantness.
Poor: Poor, with strong bitterness/acridness.
{Criteria for Evaluating Biting Sensation}
3: Excellent; crisp and easy to bite.
2: Not so stiff, and rather crisp.
1: Poor; stiff and difficult to bite.
{Criteria for Evaluating Moistness}
3: Excellent; moist texture.
2: Rather moist.
1: Poor; dry and no moistness.
{Criteria for Evaluating Meltability in Mouth}
3: Excellent; easy to soften in the mouth, and easy to swallow.
2: Rather easy to soften in the mouth, and rather easy to swallow.
1: Poor; tends to feel hard in the mouth, and difficult to swallow.

TABLE 1

|  |  | Example | | | | | | | Comparative Example | | |
|---|---|---|---|---|---|---|---|---|---|---|---|
|  |  | 1 | 2 | 3 | 4 | 5 | 6 | 7 | 1 | 2 | 3 |
| Material | Soft wheat flour (parts by mass) | 100 | 100 | 100 | 100 | 100 | 100 | 100 | 100 | 100 | 100 |
|  | Emulsifier Monoglycerol fatty acid ester (parts by mass) | 0.2 | 1.0 | 2.0 | 5.0 | 8.0 | 10.0 | — | 0 | 15.0 | 1.0 |
|  | Lecithin parts by mass) | — | — | — | — | — | — | 1.0 | — | — | — |
| Heating treatment | Heating temperature (° C.) | 110 | 110 | 110 | 110 | 110 | 110 | 110 | 110 | 110 | No heating treatment |

TABLE 1-continued

|  |  |  | Example | | | | | | | Comparative Example | | |
|---|---|---|---|---|---|---|---|---|---|---|---|---|
|  |  |  | 1 | 2 | 3 | 4 | 5 | 6 | 7 | 1 | 2 | 3 |
|  | Heating time (sec.) | | 10 | 10 | 10 | 10 | 10 | 10 | 10 | 10 | 10 | No heating treatment |
| Cereal flour composition | Flavor | | Good | Good | Good | Fair | Fair | Fair | Good | Good | Poor | Good |
|  | Texture evaluation | Biting sensation | 2.0 | 2.4 | 2.4 | 2.4 | 2.6 | 2.7 | 2.0 | 1.3 | 2.8 | 1.4 |
|  |  | Moistness | 2.6 | 2.6 | 2.6 | 2.5 | 2.5 | 2.5 | 2.5 | 2.2 | 2.5 | 2.1 |
|  |  | Meltability in the mouth | 2.2 | 2.3 | 2.1 | 2.2 | 2.2 | 2.2 | 2.3 | 1.3 | 2.2 | 1.4 |
|  | Overall rating | | Good | Good | Good | Good | Good | Good | Good | Poor | Poor | Poor |

As shown in Table 1, the Examples are superior to the Comparative Examples in terms of flavor and texture. Comparative Example 1 did not include an emulsifier, and thus was poor in texture (particularly, biting sensation and meltability in the mouth). Comparative Example 2 had an excessive blending amount of emulsifier, and thus, had good texture but was poor in flavor. In Comparative Example 3, the cereal flour and the emulsifier were simply mixed and the mixture was not heated; thus, Comparative Example 3 had a poor rating. From the above, it is understood that, in order to obtain a cereal flour composition capable of providing a cereal flour-containing food (pancake) in which the excellent texture obtained immediately after being produced is less prone to deteriorate over time and that is capable of maintaining excellent texture even when it is re-heated in a microwave oven, it is effective to blend, to a cereal flour, a specific amount of emulsifier (0.2 to 10 parts by mass with respect to 100 parts by mass of cereal flour), and also subject the mixture to a heating treatment.

TABLE 2

|  |  |  | Example | | | | | Reference Example | |
|---|---|---|---|---|---|---|---|---|---|
|  |  |  | 8 | 9 | 10 | 2 | 11 | 1 | 2 |
| Material | Soft wheat flour (parts by mass) | | 100 | 100 | 100 | 100 | 100 | 100 | 100 |
|  | Monoglycerol fatty acid ester (parts by mass) | | 1.0 | 1.0 | 1.0 | 1.0 | 1.0 | 1.0 | 1.0 |
| Heating treatment | Heating temperature (° C.) | | 80 | 90 | 100 | 110 | 120 | 70 | 130 |
|  | Heating time (sec.) | | 10 | 10 | 10 | 10 | 10 | 10 | 10 |
| Cereal flour composition | Flavor | | Good | Good | Good | Good | Good | Good | Fair |
|  | Texture evaluation | Biting sensation | 1.8 | 2.1 | 2.2 | 2.4 | 2.3 | 1.5 | 2.4 |
|  |  | Moistness | 2.0 | 2.5 | 2.6 | 2.6 | 2.6 | 1.7 | 2.0 |
|  |  | Meltability in the mouth | 1.7 | 2.1 | 2.2 | 2.3 | 2.2 | 1.4 | 1.0 |
|  | Overall rating | | Fair | Good | Good | Good | Good | Poor | Poor |

Table 2 summarizes the effect of the heating temperature (product temperature) with respect to the items evaluated. As shown in Table 2, the favorable heating temperature for the mixture including a cereal flour and an emulsifier was from 80 to 120° C., more preferably from 100 to 120° C. It should be noted that, in Reference Example 2, the heating temperature for the mixture was set to 130° C.; in this case, a favorable biting sensation was maintained, but the flavor and meltability in the mouth were poor.

TABLE 3

|  |  | Example | | | | | Reference Example |
|---|---|---|---|---|---|---|---|
|  |  | 12 | 2 | 13 | 14 | 15 | 3 |
| Material | Soft wheat flour (parts by mass) | 100 | 100 | 100 | 100 | 100 | 100 |
|  | Monoglycerol fatty acid ester (parts by mass) | 1.0 | 1.0 | 1.0 | 1.0 | 1.0 | 1.0 |
| Heating treatment | Heating temperature (° C.) | 110 | 110 | 110 | 110 | 110 | 110 |
|  | Heating time (sec.) | 2 | 10 | 20 | 60 | 180 | 240 |
| Cereal flour | Flavor | Good | Good | Good | Good | Fair | Poor |

TABLE 3-continued

| | | | Example | | | | | Reference Example |
| --- | --- | --- | --- | --- | --- | --- | --- | --- |
| | | | 12 | 2 | 13 | 14 | 15 | 3 |
| composition | Texture evaluation | Biting sensation | 2.1 | 2.4 | 2.3 | 2.4 | 2.5 | 2.6 |
| | | Moistness | 2.5 | 2.6 | 2.6 | 2.3 | 1.8 | 1.5 |
| | | Meltability in the mouth | 2.2 | 2.3 | 2.1 | 2.1 | 2.0 | 1.8 |
| | | Overall rating | Good | Good | Good | Good | Fair | Poor |

Table 3 summarizes the effect of the heating time with respect to the items evaluated. As shown in Table 3, the favorable heating time for the mixture including a cereal flour and an emulsifier was from 2 to 60 seconds, more preferably from 2 to 20 seconds.

INDUSTRIAL APPLICABILITY

According to the present invention, it is possible to provide a cereal flour composition capable of providing a cereal flour-containing food in which the excellent texture obtained immediately after being produced is less prone to deteriorate over time and that is capable of maintaining excellent texture even when it is re-heated in a microwave oven etc. Stated differently, a cereal flour-containing food of the present invention produced by using the present cereal flour composition, or the present cereal flour premix including the cereal flour composition, has excellent texture (crisp biting sensation, moistness, and meltability in the mouth), and the excellent texture does not deteriorate even when the food has become cold, and texture degradation is less likely to occur even when the food is re-heated in a microwave oven etc.

The invention claimed is:

1. A process for producing a cereal flour composition comprising a cereal flour and 0.2 to 10 parts by mass of an emulsifier with respect to 100 parts by mass of the cereal flour, the process comprising:
  a heating step of directly applying saturated water vapor to a mixture comprising the cereal flour and 0.2 to 10 parts by mass of the emulsifier with respect to 100 parts by mass of the cereal flour, and heating the mixture,
  wherein the heating step is performed by using a production device including
    a transporting path that transports the mixture introduced to the production device to an outlet, and
    a mechanism that introduces saturated water vapor into the transporting path, and
  wherein during the heating step, the mixture in the transporting path is not pressed toward the outlet of the production device using an extrusion tool.

2. The process according to claim 1, wherein the heating treatment is a treatment of performing heating for 2 seconds to 3 minutes under a condition in which the temperature of the mixture is from 80 to 120° C.

3. The process according to claim 1, wherein the heating treatment is a heat-moisture treatment using water and/or water vapor.

4. The process according to claim 1, wherein the emulsifier is at least one type of emulsifier selected from monoglycerol fatty acid esters and lecithin.

5. The process according to claim 4, wherein the heating treatment is a heat-moisture treatment using water and/or water vapor.

6. The process according to claim 4, wherein the heating treatment is a treatment of performing heating for 2 seconds to 3 minutes under a condition in which the temperature of the mixture is from 80 to 120° C.

7. The process according to claim 6, wherein the heating treatment is a heat-moisture treatment using water and/or water vapor.

* * * * *